W. F. MILLER.
GRINDING AND POLISHING MACHINE.
APPLICATION FILED NOV. 20, 1911.
1,025,417.
Patented May 7, 1912
2 SHEETS—SHEET 1.
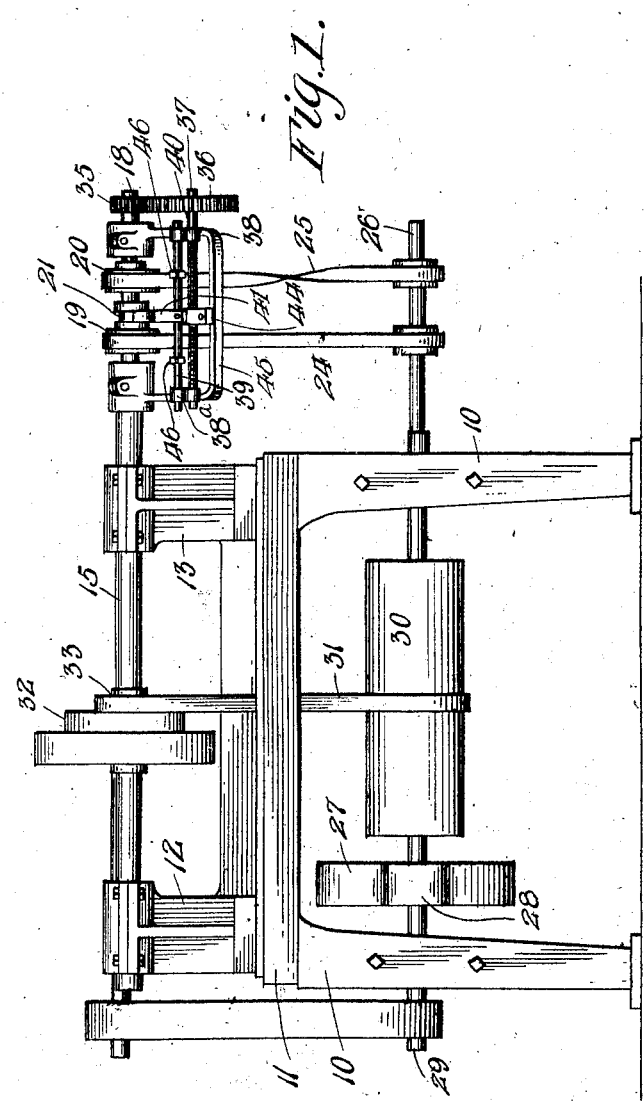
WITNESSES
INVENTOR
William F. Miller,
by ........ Attorney

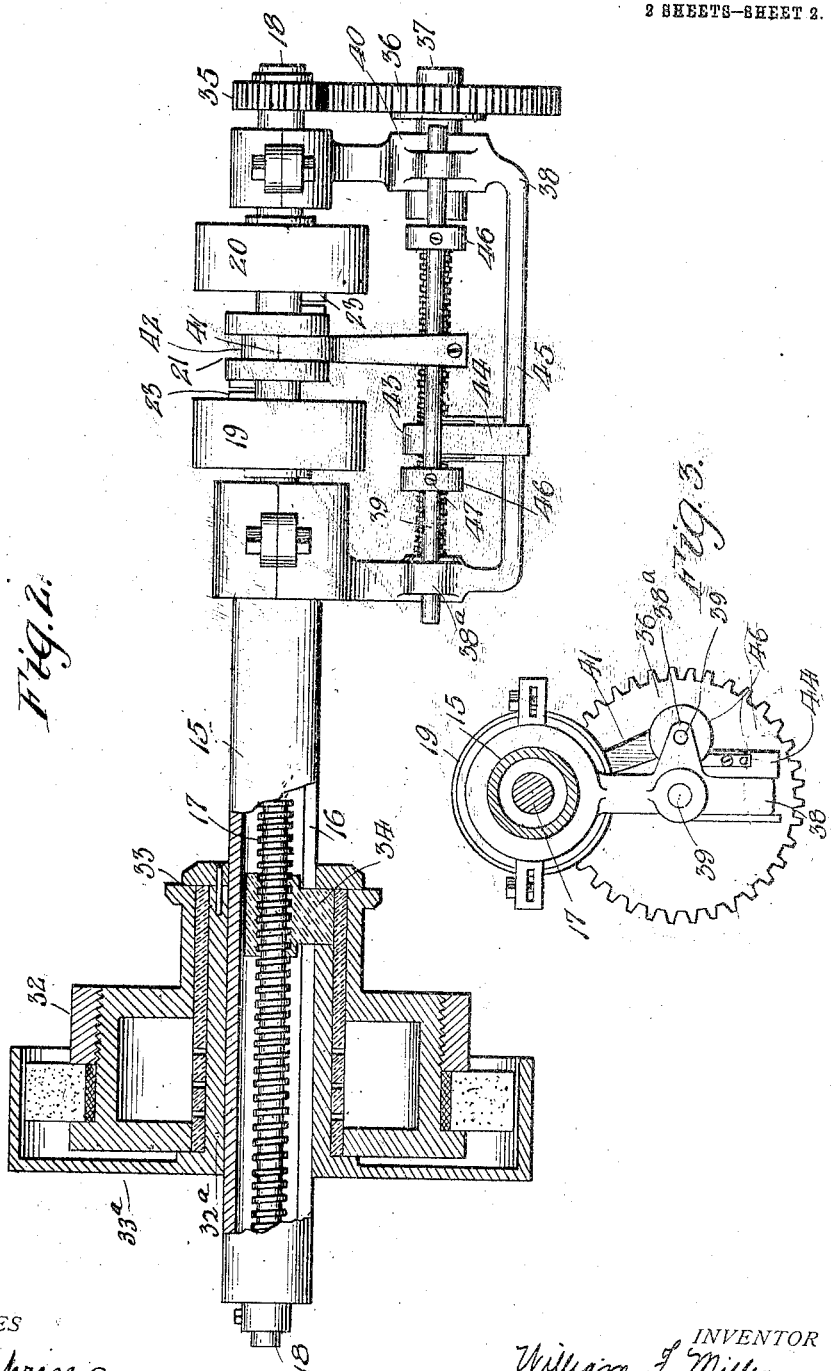

UNITED STATES PATENT OFFICE.

WILLIAM F. MILLER, OF FOND DU LAC, WISCONSIN.

GRINDING AND POLISHING MACHINE.

1,025,417.

Specification of Letters Patent.

Patented May 7, 1912.

Application filed November 29, 1911. Serial No. 661,344.

*To all whom it may concern:*

Be it known that I, WILLIAM F. MILLER, a citizen of the United States of America, and resident of Fond du Lac, in the county of Fond du Lac and State of Wisconsin, have invented certain new and useful Improvements in Grinding and Polishing Machines, of which the following is a specification.

This invention relates to grinding and polishing machines and particularly to means for driving a buffer or grinding wheel as well as to means for moving said wheel laterally in opposite directions, the invention further residing in novel means for shifting or controlling the buffer controlling device whereby the operation is carried on automatically.

A further object of this invention is to produce a machine of the character noted which will possess advantages in points of simplicity, efficiency and durability proving, at the same time, comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a machine with the invention applied thereto; Fig. 2 illustrates an enlarged detail view, partly in section and partly in elevation showing the buffer controlling mechanism; Fig. 3 illustrates a sectional view on the line 3—3 of Fig. 2.

In these drawings I have shown the invention applied to a base or stand and I have also illustrated particular means for communicating power to the mechanism but this illustration is employed as but one means of disclosing the invention, it being understood that the attachment may be applied to any machine supplied with bearings for rotatably supporting the parts of the shifting mechanism.

In the drawings, 10 denotes a base or stand having a bed plate 11, the said bed plate having journal bearings 12 and 13 thereon. A sleeve 15 is supported by the journal bearings, the said sleeve having a longitudinally disposed slot 16, the said sleeve being intended to confine a screw 17 which screw forms a part of a shaft 18 journaled in the bearings 12 and 13, the said shaft projecting beyond the bearing at one end. The shaft 18 has pulleys 19 and 20 rotatable loosely on it and the said shaft is further provided with a clutch 21 which may be thrown into engagement with the wheel 19 or 20 alternately, the said clutch and wheels being provided with any suitable type of clutch members adapted to engage for the purpose of communicating the motion of the wheels to the shaft, the said clutch members being here shown as projections 22 and 23 respectively on the clutch member and the wheels, it being understood that the said clutch member 21 is splined on the shaft 18 so that motion of either pulley communicated to the clutch member will serve to rotate the said shaft. As shown in Fig. 1, the pulleys 19 and 20 are connected with belts 24 and 25 respectively, the latter of which is crossed in order that it may drive the pulley 20 in a direction opposite to the direction of rotation of the pulley 19 when the said belts are driven from a shaft 26 common to both of them. It is shown in the drawing that the shaft 26 has a large pulley 27 which is belted to a pulley 28 on the shaft 29, the said shaft 29 containing a drum pulley 30 for engaging the belt 31 to permit the said belt to travel longitudinally of the said drum pulley. Power is communicated to the several shafts in any appropriate way, but as the details of construction for accomplishing the result is immaterial, they are not here shown.

The buffer or grinding wheel 32 is associated with and preferably mounted on a collar 32ª which collar has an integral guard 33ª extending partially over the periphery of the grinding wheel for the purpose of protection. A fragment of the said guard may, of course, be removed on one side to permit access to the grinding surface of the wheel. The collar and the wheel and the parts associated therewith are connected together in any appropriate way so that they will be freely rotatable on the sleeve 15 and are provided with a flange hub 33 which is engaged by the belt 31 whereby the said grinding wheel is rotated continuously in one direction while it is permitted to travel longitudinally of the sleeve owing to the travel afforded the belt 31 and the movement communicated to the buffer wheel by reason of its being connected through the medium of the nut 34, which is attached to it, with the screw rotatable within the sleeve 15. As the shaft 18 having the screw thereon may be rotated in opposite directions through the belts and pulleys heretofore described, it follows that when the said shaft is rotated in one direction, the grinding wheel will travel under the influence of the screw longitudinally of the sleeve in a certain direction whereas when the clutch is moved out of engagement with the pulley into engagement with the other pulley, the direction of rotation of the shaft 18 is changed so that the screw will move the grinding wheel on the sleeve in an opposite direction to that which it first traveled.

As a means for automatically shifting the direction of rotation of the screw, an automatically controlled clutch actuating mechanism is provided which will disengage from one wheel and cause it to engage the other wheel and vice versa. To the end just mentioned, the shaft 18 is provided with a pinion 35 meshing with a pinion 36 on a short shaft 37, the said shaft 37 being journaled in a yoke 38 which is suitably supported as shown. The yoke is provided with lugs 38ª, apertured to receive the thrust rod 39 in order to permit reciprocating movement of the said thrust rod. The yoke is further provided with journal bearings 40 in which a screw 41ª is rotatably mounted and driven by means of the pinion 36. A forked arm 41 is attached to the thrust rod and partially embraces the clutch 21 by lying in a groove 42 in said clutch 21 so that movement of the thrust rod is communicated to the clutch member by reason of this connection. A traveling nut 43 is threaded on the screw and has an extension 44 apertured to receive the straight portion 45 of the yoke whereby it is guided. The thrust rod 39 has adjustable collars 46 secured to it, the said collars being spaced apart a distance approximately equal to that which it is intended the buffer wheels shall travel on the sleeve, the said collars 46 being in the path of travel of the nut 43 or the extension 44 in order that the said nut or extension will engage one or the other of said collars and communicate motion to the thrust rod and that the arm on the thrust rod may in turn communicate motion to the clutch because of its engagement and disengagement of the pulleys heretofore described for the purpose of shifting the direction of rotation of the screw. As the collars are adjustable on the thrust rods by means of the screws 47 it follows that the operator will be able to control the distance of travel of the grinding wheel by simply limiting the distance of travel of the nut 43 with relation to the screw which it engages. The construction of the grinding wheel or buffer is well shown in Fig. 2.

In the operation of this grinding device and particularly of the means for shifting the same, it will be observed that the pinions 35 and 36 will continuously rotate the screw so long as the power is applied to the machine, the direction of rotation shifting as the direction of rotation of the shaft 15 is shifted under the influence of the clutch and the parts heretofore described for shifting the said clutch.

I claim—

1. In a grinding machine, a frame, a sleeve supported by said frame, a shaft carrying a grinding wheel rotatable in said sleeve, means for rotating said shaft, oppositely rotating pulleys loosely mounted on said shaft, and a clutch mounted between said pulleys, a yoke having bearings supported by said sleeve, a thrust-rod slidable in said bearings, said thrust-rod having spaced collars fixed thereto, a forked arm having one end thereof fixed to said thrust-rod between said spaced collars, and the opposite end thereof adapted to engage the said clutch member for operating the same, a screw-threaded shaft mounted on said yoke, a nut threaded to travel on said shaft, said nut adapted to engage the said collars on the thrust-rod for communicating motion thereto.

2. In a grinding machine, a frame, a sleeve supported by said frame, a shaft rotatable within said sleeve, a grinding wheel rotated by said shaft, pulleys loosely mounted on said shaft, a clutch member mounted between said pulleys, a yoke supported by said sleeve, and a thrust rod carried by the yoke, means operated by said thrust rod for alternately throwing the clutch into engagement with the pulleys, a gear wheel on one end of said shaft, and a gear wheel on said thrust rod adapted to mesh with the aforesaid gear wheel, for giving movement thereto.

In testimony whereof, I affix my signature in the presence of two witnesses.

WILLIAM F. MILLER.

Witnesses:
E. P. WORTHING,
WALTER E. TACK.